United States Patent
Hamaya

[11] Patent Number: 5,960,844
[45] Date of Patent: Oct. 5, 1999

[54] METHOD AND APPARATUS FOR MONITORING CONDITIONS OF A VEHICLE TIRE

[75] Inventor: Hiromi Hamaya, Cuyahoga Falls, Ohio

[73] Assignee: Bridgestone/Firestone, Inc., Akron, Ohio

[21] Appl. No.: 08/996,420

[22] Filed: Dec. 22, 1997

[51] Int. Cl.[6] ............................ B60C 23/00; G08C 17/00
[52] U.S. Cl. ................................. 152/152.1; 340/425.5; 340/447; 156/110.1
[58] Field of Search ...................... 152/152.1; 340/447, 340/445, 425.5; 156/110.1

[56] References Cited

U.S. PATENT DOCUMENTS

| | | | |
|---|---|---|---|
| 4,067,235 | 1/1978 | Markland et al. | 73/146.5 |
| 4,160,234 | 7/1979 | Karbo et al. | 340/58 |
| 4,242,671 | 12/1980 | Plows | 340/572 |
| 4,311,985 | 1/1982 | Gee et al. | 340/58 |
| 4,319,220 | 3/1982 | Pappas et al. | 340/58 |
| 4,578,992 | 4/1986 | Galasko et al. | 73/146.5 |
| 4,609,905 | 9/1986 | Uzzo | 340/58 |
| 4,695,823 | 9/1987 | Vernon | 340/58 |
| 4,717,905 | 1/1988 | Morrison, Jr. et al. | 340/58 |
| 4,845,649 | 7/1989 | Eckardt et al. | 364/571.02 |
| 4,911,217 | 3/1990 | Dunn et al. | 152/152.1 |
| 5,483,827 | 1/1996 | Kulka et al. | 73/146.5 |
| 5,500,065 | 3/1996 | Koch et al. | 156/123 |
| 5,562,787 | 10/1996 | Koch et al. | 156/64 |
| 5,573,610 | 11/1996 | Koch et al. | 152/152.1 |
| 5,573,611 | 11/1996 | Koch et al. | 152/152.1 |

OTHER PUBLICATIONS

1983 The Institution of Electrical Engineers, Tiris: A Vehicle Tracking System Using Passive Radio Transponders.

*Primary Examiner*—Francis J. Lorin
*Attorney, Agent, or Firm*—D. A. Thomas

[57] ABSTRACT

A method for monitoring various physical conditions of pneumatic tires and to a tire which includes a memory device mounted on the interior of the tire within the pressurizable cavity and a separate monitoring device mounted on the tire rim. The memory device contains a battery, an antenna and stored data pertaining to the tire. The monitoring device uses an active self-powered programmable electronic circuitry which obtains data from the memory device and in addition contains one or more sensors which obtains engineering conditions such as temperature, pressure, tire rotation and/or other operated conditions of the pneumatic tire along with the stored information from the memory device. The memory device can be actuated by externally transmitted radio frequency waves from a remote location or by signals from the monitoring device, and the monitoring device can transmit the information to the remote location by a separate, larger and more powerful battery which is mounted on the tire rim than the battery in the memory device.

17 Claims, 1 Drawing Sheet

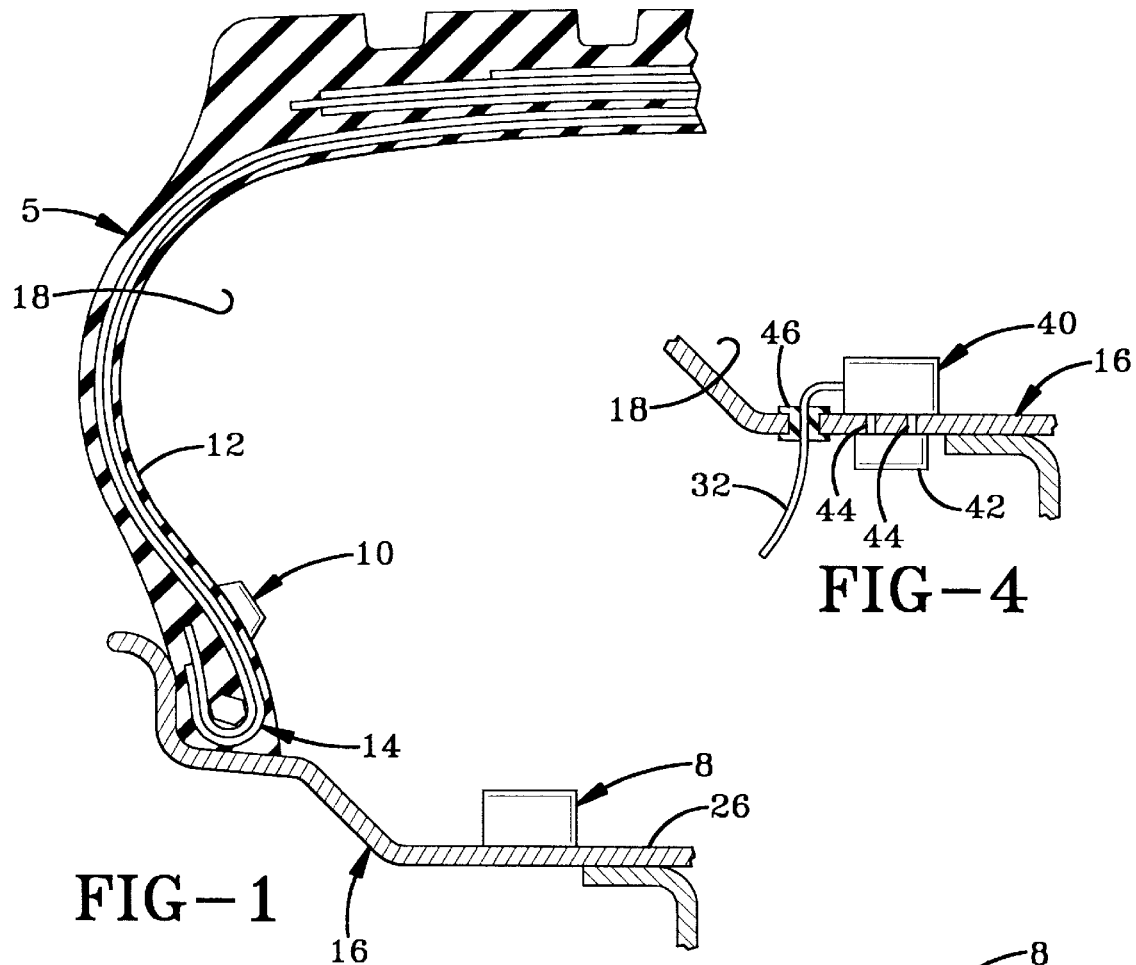
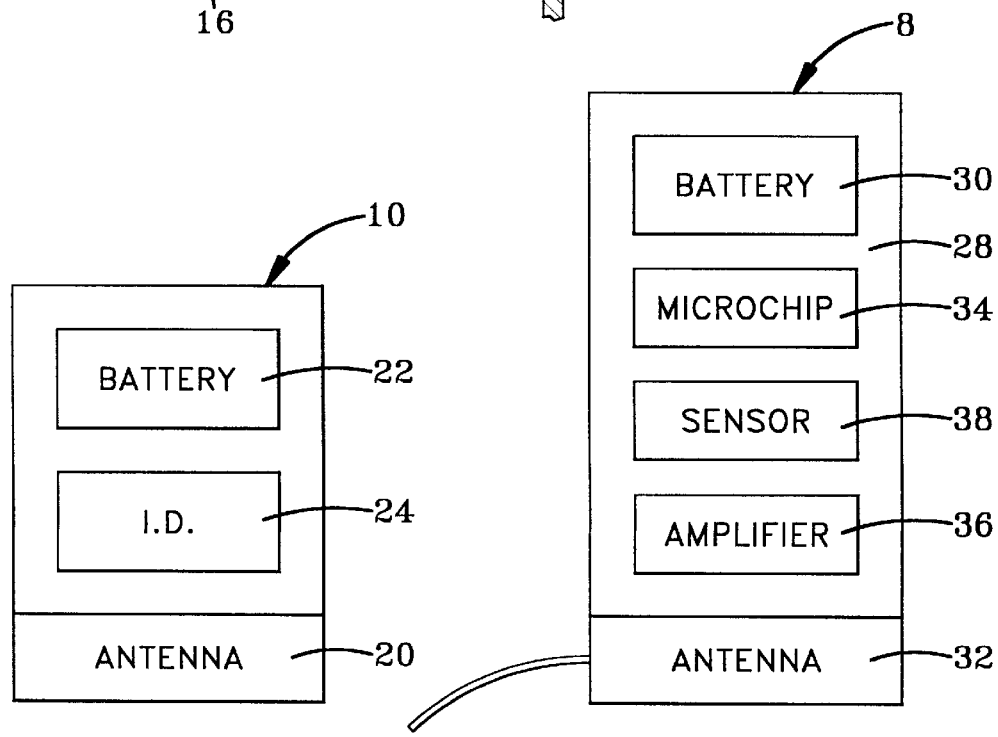

METHOD AND APPARATUS FOR MONITORING CONDITIONS OF A VEHICLE TIRE

BACKGROUND OF THE INVENTION

1. Technical Field

The invention relates to a method for monitoring various physical conditions of a pneumatic tire and to a tire having a memory device containing stored information relating to the tire, and a monitoring device. More particularly, the invention relates to a method and tire construction in which the memory device attaches to the tire innerliner and contains electronics to maintain stored data regarding the tire, preferably an antenna and a low powered battery to transmit and receive data to and from the monitoring device mounted on the tire rim. The monitoring device incorporates a sensing package to interpret temperature and pressure of the tire and has a larger longer life battery than the memory device for communicating with the memory device within the tire and for transmitting and receiving data to and from a source remote. These two separate devices enable the memory device on the tire to be reduced in size and cost and provides a longer service life thereto.

2. Background Information

It is desirable to monitor the condition of tires as to wear, internal temperature and internal pressure. It is particularly advantageous to monitor large truck tires since these are expensive and must be regularly maintained to maximize vehicle efficiency. In the past, such monitoring activities have generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Other prior art devices used for monitoring tire conditions have comprised self-powered circuits which are positioned external of the tire, such as at the valve stem. Externally mounted devices have the disadvantage of being exposed to damage, such as from weather and vandalism. Another disadvantage with installing devices external of the tire is that the device itself introduces additional sealed joints from which air may leak. Additionally, externally installed devices can easily become disassociated from a particular tire which is being monitored.

Another disadvantage with known tire monitoring and identification devices is that communication transmissions are achieved using conventional radio frequencies which generally require a relatively large antenna which must be mounted externally or secured to the tire in such a manner which requires relatively major modifications in the tire construction or assembly process.

Many of these problems have been eliminated by the method and tire construction shown and described in U.S. Pat. Nos. 5,500,065; 5,562,787; 5,573,610 and 5,573,611. However, for certain applications and tire constructions, especially when the tire will be retreaded, it is desirable to protect the sensors from excessive heat which occurs during the retreading process, and for certain applications to provide the tire with only a part of the complete monitoring package by providing a simplified memory device which can be incorporated into the tire either at manufacture or applied after manufacture, and used with or without more detailed sensors depending upon the particular application in which the tire will be utilized.

Although the method and tire monitoring devices shown and described in the above four mentioned patents provide many advantages over the prior art, it is desirable to provide for a tire monitoring system which provides greater versatility by embedding only certain components within the tire at the time of manufacture or separately applying the same to the tire after manufacture, which components are less susceptible to damage by heat and wear, for example, during vulcanization and retreading of the tire, yet which are adapted to be compatible with other components of the monitoring system, which components need not be permanently installed within the tire at time of manufacture, and which most importantly enables a larger and longer life power source to be utilized than is achievable with prior art monitoring systems.

SUMMARY OF THE INVENTION

In accordance with one aspect of the present invention, a method of monitoring tires is provided in which an activatable memory device or tag is mounted within at least one tire of a vehicle on the inner surface thereof, which device contains stored data pertaining to the tire, and in which the memory device is activated by means of a monitoring device mounted on the tire rim within the pressurizable cavity formed within the tire.

Another objective of the invention is to provide such a method and tire construction in which the memory device has a relatively low power battery and an antenna for transmitting the stored data either directly to an external source or to the monitoring device mounted within the tire cavity; and in which the monitoring device has a larger power source or battery than that within the memory device for transmitting the stored data from the memory device to a remote location.

Another objective is to provide such a method and tire construction in which the monitoring device contains sensors for sensing engineering conditions of the tire such as internal pressure and temperature, which information is also transmitted to a remote location through a separate antenna located at the monitoring device.

A still further objective is to provide such a method and tire construction in which the antenna of the monitoring device may be located entirely within the pressurizable cavity or may extend through the tire rim so as to terminate externally thereof, thereby requiring less power to transmit the stored and sensed data to an external source than would be required if the antenna were located entirely within the pressurizable cavity of the tire due to the interference caused by the surrounding steel belts and tire rim.

A further objective of the invention is to provide such a method and tire construction in which the antenna of the monitoring device when extending through the rim external to the pressurizable cavity can be provided with various lengths in order to tune the antenna to match that of a particular interrogator located at a remote location.

Another objective of the invention is to provide such a method and tire construction in which the battery of the monitoring device may be mounted externally on the tire rim and removably connected electrically and physically to the other components of the memory device which are mounted on the rim within the pressurizable cavity thereby enabling easy replacement of the battery should it become weak without requiring removal or deflation of the tire with respect to the rim.

A still further objective is to provide such a method and tire construction in which the monitoring device includes an integrated circuitry and a programmable microprocessor for processing the electrical signals received from the sensor and when obtaining data from the memory device.

Another objective is to provide such a method and tire construction in which the memory device can be secured to the tire wall either during manufacture of the tire or secured thereto after manufacture by utilizing a chemical or heat activatable adhesive in such a manner and location to minimize stress, strain, cyclic fatigue, impact and vibration.

These objectives and advantages are obtained by the improved method of the present invention, the general nature of which may be stated as a method for monitoring at least one condition of a pneumatic tire which is mounted on a rim forming an internal pressure cavity, said method comprising the steps of providing the tire with a memory device which provides for the storage of data pertaining to the tire; securing the memory device to the tire within said internal pressure cavity; providing a monitoring device which includes a sensor, an amplifier, a first antenna, a first power source and a control circuit for sensing the tire data stored in the memory device; securing the monitoring device on the rim remote from the memory device; transmitting the stored data from the memory device to the monitoring device; and retransmitting the stored data from the monitoring device to a remote location.

These objectives and advantages are further obtained by the tire construction of the present invention, the general nature of which may be stated as a tire mounted on a rim defining a pressurizable cavity between the tire and rim and having means for monitoring the tire, said monitoring means including a memory device mounted on the tire within the pressurizable cavity and containing stored data pertaining to the tire; a monitoring device spaced from the memory device mounted on the rim, said monitoring device including a first battery, an amplifier, a control circuit for sensing the stored data in the memory device, and a first antenna for transmitting the stored data to a location remote from the tire.

BRIEF DESCRIPTION OF THE DRAWINGS

Preferred embodiments of the invention, illustrative of the best mode in which applicant has contemplated applying the principles, are set forth in the following description and are shown in the drawings and are particularly and distinctly pointed out and set forth in the appended claims.

FIG. 1 is a fragmentary diagrammatic cross-sectional view of one-half of a pneumatic tire with the memory device mounted on the innerliner thereof and the monitoring device mounted on the rim within the pressurizable cavity of the tire;

FIG. 2 is a block diagram of the components of the memory device;

FIG. 3 is a block diagram of the components of the monitoring device; and

FIG. 4 is a fragmentary sectional view of a modified mounting arrangement of the monitoring device on the tire rim.

Similar numerals refer to similar parts throughout the drawings.

DESCRIPTION OF THE PREFERRED EMBODIMENT

Referring to FIG. 1 of the drawings, there is shown a partial sectional view of a pneumatic tire 5 having a memory device 10 secured to the inner wall or liner 12 in a region closely adjacent the bead package 14. Tire 5 is mounted on a usual metal rim indicated generally at 16, which forms an internal pressure chamber of cavity 18 which receives a supply of air through a usual valve for inflating the tire. The preferred location of memory device 10, as discussed in U.S. Pat. Nos. 5,500,065; 5,562,787; 5,573,610 and 5,573,611, the contents of which are incorporated herein by reference, is a distance of about 1 to 2 inches above the toe bottom of the tire in order to reduce cyclic strain thereon.

As diagrammatically represented in FIG. 2, memory device 10 preferably includes an antenna 20, a battery 22 and an electronic chip indicated at 24, which contains stored data, such as identification information pertaining to the particular tire on which memory device 10 is mounted.

Memory device 10 may be assembled with the tire during its manufacture or secured thereto by a solvent or heat activatable adhesive such as described in the four previously identified patents. Also if desired, monitoring device 10 may not have its own battery 22 or antenna 20 but could contain an appropriate electronic circuit which could be activated by an external signal thereby providing for an even smaller and less expensive device than would be required if it contains its own battery and antenna.

In accordance with one of the main feature of the invention, a separate monitoring device indicated generally at 8 is mounted on inside surface 26 of rim 16. Monitoring device 8 (FIG. 3) preferably is encased within an encapsulating material 28 so as to be less affected by the ambient temperature, pressures and other harsh environment to which it may be exposed. Device 8 preferably includes a battery 30, an antenna 32, a microchip 34 containing the appropriate electronic control circuitry which is connected with and operated by an amplifier 36. Preferably a sensor 38 is included in device 8 and communicates with chamber 18 so as to sense an engineering condition of the tire, such as the internal temperature and/or pressure. Sensor 38 is connected through the circuitry of microchip 34 and amplifier 36, which information is then transmitted by antenna 32 to a remote interrogating unit. This interrogating unit preferably will be located in the cab of a truck or could be remotely located at a completely external location which is operable when the tire or vehicle is in the vicinity thereof. The details of microchip 34, amplifier 36 and sensor 38 preferably are the type which are described in detail in the four previously mentioned patents, and thus are not described in further detail.

FIG. 4 shows a modified monitoring device 40 which is mounted on rim 16 as is device 8. However, battery 42 thereof is connected to the microchip, amplifier, sensor and antenna through connectors 44 which preferably extend through openings in rim 16. Antenna 32 extends through a sealing grommet 46 to a position externally of cavity 18.

In accordance with one of the main features of the invention, monitoring devices 8 and 40 are separate components spaced from memory device 10 enabling them to be mounted on the tire rim with the battery being either internal or external with respect to the pressurizable cavity 18 thereby rendering them unaffected by the high temperatures which the tire incurs during its initial manufacture and vulcanization and subsequent retreading, which is common in larger truck size tires. Also, the particular microchip and sensor thereof need not be dedicated to a particular tire but can be changed to achieve various results without specific regards to the particular tire on which it will be mounted.

Most importantly, monitoring devices 8 and 40, and in particular batteries 30 and 42 thereof, can be considerably larger and have greater power output than battery 22 of memory device 10. This simplifies memory device 10 and reduces considerably its cost and size over the memory devices of prior art monitoring systems. Also, batteries 30 and 42 can be larger and more powerful since they will not effect the ride provided by the tire since they are usually mounted centrally on rim 16 and not located on one side of the tire as is device 10. Also, they are unaffected by the heat of vulcanization and can be replaced easier than if formed as an integral component of the memory device which may be formed as an integral part of the tire. Most importantly, the embodiment shown in FIG. 4 wherein battery 42 is located externally of cavity 18 on the outer surface of the rim, enables the battery to be easily replaced through its connectors 44 without even deflating the tire, and most importantly without having to remove the tire from the rim as is required in prior art monitoring systems wherein the battery is mounted on the interior of the tire.

Another important advantage of the monitoring system of the present invention is the placement of antenna 32 exteriorly of cavity 18 by feeding it through a grommet 46 or other type of protected seal in the tire, such as the inflation stem.

This enables battery 42 to consume less power to transmit the information to a remote interrogator since it is not surrounded by the usual steel belts of a tire as in prior art systems wherein the antenna is located entirely within cavity 18. Furthermore, the antenna can be "tuned" by varying the length thereof since it is readily accessible exteriorly of the tire. Again, one of the most important features is the ability to use a larger and more powerful battery since it is mounted as a separate component on the rim, and which is easily replaced should it become damaged or after loss of life, and that the components of monitoring device 8 and 40 may not be dedicated to a particular tire which is mounted on the rim. Furthermore, even if the same size battery is utilized in monitoring devices 8 and 40 as incorporated into prior art memory devices such as device 10, it will have a longer service life since it is less affected by heat and the harsh surrounding environment, and especially when the antenna is located externally of the tire cavity as shown in FIG. 4.

It is also readily apparent that memory device 10 could be activated directly by an outside interrogator and functions without its own internal battery, although the use of a low power battery and antenna contained within the device is preferable since the same can be achieved relatively inexpensive and will provide increased versatility thereto. Another advantage is that memory device 10, due to its low cost of production and installation, will have a particular memory pertaining to the tire in which it is affixed and need not be erased and reprogrammed when put on a different rim and will remain on the tire throughout its life. Again, the chief advantage is that the monitoring system is more versatile since it is not limited by battery size and power as in those installations in which the battery is part of the device mounted directly on the tire thereby providing increased flexibility and ease of maintenance than heretofore possible with known prior art tire monitoring systems and apparatus.

Accordingly, the improved method and apparatus for monitoring conditions of a vehicle tire is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus for monitoring conditions of a vehicle tire is constructed and used, the characteristics of the construction, and the advantageous, new and useful results obtained, the new and useful structures, devices, elements, arrangements, parts and combinations and method steps, are set forth in the appended claims.

I claim:

1. A method of monitoring a pneumatic tire which is mounted on a rim forming an internal pressure cavity, said method comprising the steps of:

providing a memory device containing identification data pertaining specifically to the tire and a first antenna for transmitting said identification data;

securing the memory device permanently to the tire within said internal pressure cavity;

providing a monitoring device which includes a sensor, an amplifier, a second antenna, a first power source and a control circuit for sensing the tire identification data stored in the memory device when transmitted by wireless communication form the first antenna;

securing the monitoring device on the rim remote from the memory device;

transmitting by wireless communication the stored identification data from the memory device to the monitoring device independent of the operating condition of the tire; and retransmitting the stored identification data from the monitoring device to a remote location independent of the operating condition of the tire.

2. The method defined in claim 1 wherein the memory device is secured to the innerliner of the tire.

3. The method defined in claim 1 including the step of securing the sensor, amplifier and first antenna to the rim within the pressure cavity of the tire.

4. The method defined in claim 3 including the further step of securing the first power source on the rim externally of the pressure cavity of the tire.

5. The method defined in claim 1 including the step of providing the memory device with a second power source.

6. The method defined in claim 5 including the step of transmitting the stored data from the memory device to the remote location by using the first antenna and the second power source.

7. The method defined in claim 3 including the step of extending the second antenna through the rim from within the pressure cavity to a location externally of said rim.

8. The method defined in claim 1 including the step of bonding the memory device to the innerliner of the tire within the pressure cavity after finished molding of said tire.

9. The method defined in claim 1 including the step of using radio frequency (RF) for transmitting the stored data from the memory device.

10. A tire mounted on a rim and defining a pressurizable cavity between the tire and rim and having means for monitoring the tire, said monitoring means including:

a memory device permanently mounted on the tire within the pressurizable cavity and containing stored identification data pertaining to the tire and a first antenna for transmitting the identification data;

a monitoring device spaced from the memory device mounted on the rim, said monitoring device including a first battery, an amplifier, a control circuit for sensing the stored identification data in the memory device by wireless communication from the first antenna of said memory device independent of the operating condition of the tire, and a second antenna for transmitting the sensed stored identification data to a location remote from the tire.

11. The tire as defined in claim 10 wherein the memory device is secured to an innerliner of the tire in the vicinity of a tire bead.

12. The tire as defined in claim 10 wherein the first battery, the amplifier and control circuit are mounted on the rim within the pressurizable cavity.

13. The tire as defined in claim 10 wherein the monitoring device includes a sensor which communicates with the pressurizable cavity for sensing a engineering condition of the tire.

14. The tire as defined in claim 10 wherein the memory device includes a second battery and the first antenna for transmitting the stored data contained in said memory device.

15. The tire as defined in claim 10 wherein the second antenna extends through the rim and terminates externally of the pressurizable cavity.

16. The tire as defined in claim 10 wherein the control circuit and amplifier are located within the pressurizable cavity; and in which the first battery is mounted on the rim externally of the pressurizable cavity.

17. The tire as defined in claim 16 wherein the first battery is removably mounted on the rim.

\* \* \* \* \*